(12) United States Patent
Nolan

(10) Patent No.: US 7,205,424 B2
(45) Date of Patent: Apr. 17, 2007

(54) PREPARATION OF RUTHENIUM-BASED OLEFIN METATHESIS CATALYSTS

(75) Inventor: Steven P. Nolan, New Orleans, LA (US)

(73) Assignee: University of New Orleans Research and Technology Foundation, Inc., New Orleans, LA (US)

( * ) Notice: Subject to any disclaimer, the term of this patent is extended or adjusted under 35 U.S.C. 154(b) by 66 days.

(21) Appl. No.: 10/873,026

(22) Filed: Jun. 21, 2004

(65) Prior Publication Data

US 2005/0026774 A1    Feb. 3, 2005

Related U.S. Application Data

(60) Provisional application No. 60/479,771, filed on Jun. 19, 2003.

(51) Int. Cl.
*B01J 31/00* (2006.01)

(52) U.S. Cl. ............... 556/136; 556/21; 556/152; 556/155

(58) Field of Classification Search ........... 502/150, 502/152, 155, 162, 167; 548/103; 556/21, 556/136
See application file for complete search history.

(56) References Cited

U.S. PATENT DOCUMENTS

| | | | |
|---|---|---|---|
| 5,110,948 A | 5/1992 | Marks et al. | |
| 5,342,909 A | 8/1994 | Grubbs et al. | |
| 6,313,365 B1 * | 11/2001 | Hori et al. | 585/645 |
| 6,316,380 B1 | 11/2001 | Nolan et al. | |
| 6,362,357 B1 | 3/2002 | Nolan et al. | |
| 6,369,265 B1 | 4/2002 | Nolan et al. | |
| 6,403,801 B1 | 6/2002 | Nolan et al. | |
| 6,403,802 B1 | 6/2002 | Nolan et al. | |
| 6,417,363 B1 | 7/2002 | Van Der Schaaf et al. | |
| 6,426,419 B1 * | 7/2002 | Grubbs et al. | 548/101 |
| 6,500,975 B1 * | 12/2002 | Schwab et al. | 556/22 |
| 6,583,307 B2 | 6/2003 | Nolan et al. | |
| 6,586,599 B1 | 7/2003 | Nolan et al. | |
| 6,610,626 B2 * | 8/2003 | Grubbs et al. | 502/155 |
| 6,613,910 B2 | 9/2003 | Grubbs et al. | |
| 6,620,955 B1 * | 9/2003 | Pederson et al. | 556/21 |
| 6,635,768 B1 * | 10/2003 | Herrmann et al. | 548/101 |
| 6,800,170 B2 | 10/2004 | Kendall et al. | |
| 6,803,429 B2 | 10/2004 | Morgan et al. | |
| 6,818,586 B2 * | 11/2004 | Grubbs et al. | 502/155 |
| 6,844,442 B2 * | 1/2005 | Milstein et al. | 548/103 |
| 6,867,303 B2 * | 3/2005 | Grela | 548/101 |
| 6,900,347 B2 * | 5/2005 | Paulson et al. | 560/261 |
| 2002/0173650 A1 | 11/2002 | Nolan et al. | |
| 2002/0198423 A1 | 12/2002 | Nolan et al. | |

FOREIGN PATENT DOCUMENTS

WO  WO 9720865 A1 * 6/1997
WO  WO 02083742 A2 * 10/2002

OTHER PUBLICATIONS

Herrmann and Weskamp, "A Novel Class of Ruthenium Catalysts for Olefin Metathesis"; http://ch-www.st-and.ac.uk/conferences/ishc/posters/WeskampT.html.*

Nguyen and Grubbs, "Synthesis and Activities of New Single-Component, Ruthenium-Based Olefin Metathesis Catalysts", J. Am. Chem. Soc. 115, 9858-9859 (1993).*

Schwab, Grubbs and Ziller, "Synthesis and Applications of RuCl2(=CHR')(PR3)2: The Influence of the Alkylidene Moiety on Metathesis Activity", J. Am. Chem. Soc. 118, 100-110 (1996).*

Ulman and Grubbs, "Relative Reaction Rates of Olefin Substrates with Ruthenium (II) Carbene Metathesis Initiators", Organometallics 17 (1998) 2484-2489.*

* cited by examiner

*Primary Examiner*—Paul Marcantoni
(74) *Attorney, Agent, or Firm*—Garvey, Smith, Nehrbass & North, L.L.C.; Seth M. Nehrbass

(57) ABSTRACT

A synthetic method leading to the isolation of ruthenium-based olefin metathesis catalysts relies on the cross metathesis reaction between $(L_1)Ru(L_2)$(3-phenylindenylid-1-ene)$Cl_2$ (where $L_1$ and $L_2$ can be two-electron donors) and an olefin. This method leads to the isolation of numerous ruthenium olefin metathesis catalysts.

10 Claims, No Drawings

PREPARATION OF RUTHENIUM-BASED OLEFIN METATHESIS CATALYSTS

CROSS-REFERENCE TO RELATED APPLICATIONS

Priority of my prior U.S. provisional patent application Ser. No. 60/479,771, filed 19 Jun. 2003, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to olefin metathesis. More particularly, the present invention relates to synthesis of olefin metathesis catalysts.

2. General Background of the Invention

The advent of well-defined, highly reactive catalysts for olefin metathesis (ring-closing metathesis, RCM; ring-opening metathesis polymerization, ROMP; cross metathesis, CM; and their combinations) has made this technique a powerful tool in organic synthesis and polymer chemistry.[1] Metal-carbene complexes of the type $(PCy_3)_2Ru(=C(H)Ph)Cl_2$ (1)[2], and its analogues modified with nucleophilic carbenes $(PCy_3)Ru(IMes)(=C(H)Ph)Cl_2$[3] (2), and $(PCy_3)Ru(SIMes)(=C(H)Ph)Cl_2$ (3)[4] where IMes=1,3-bis(2,4,6-trimethylphenyl)imidazol-2-ylidene and SIMes=1,3-bis(2,4,6-trimethylphenyl)-4,5-dihydroimidazol-2-ylidene, are highly efficient catalyst precursors. The inventor and his colleagues have shown that the complexes of unsaturated "$C_\alpha$" ligands other than the alkylidenes such as $(PCy_3)_2Ru(3\text{-phenylindenylid-1-ene})Cl_2$ (4) and $(PCy_3)(IMes)Ru(3\text{-phenylindenylid-1-ene})Cl_2$ (5) are also active catalyst precursors in the ring-closing metathesis of dienes (FIG. 1).[5]

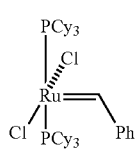

1

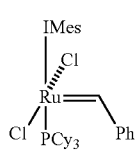

2

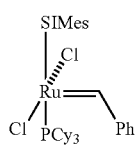

3

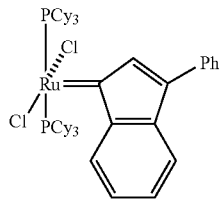

4

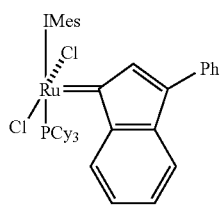

5

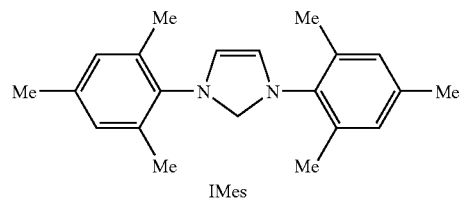

IMes

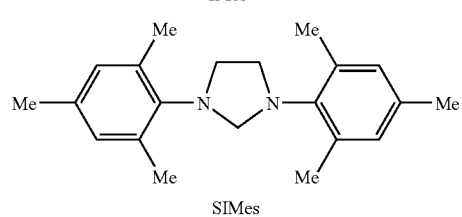

SIMes

In its most widely used preparation, complex 1 has been synthesized by reaction of $RuCl_2(PPh_3)_3$ with diazo compound according to eq. 1.

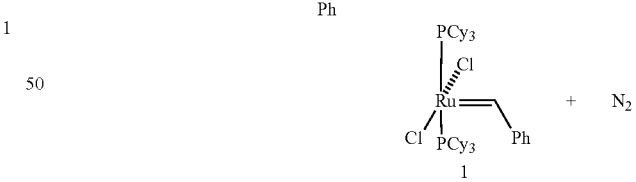

(1)

Complexes 4 and 5 are of particular interest since they are easily synthesized from $RuCl_2(PPh_3)_3$ and an alkyn-ol followed by simple ligand substitution reactions according to eq. 2.

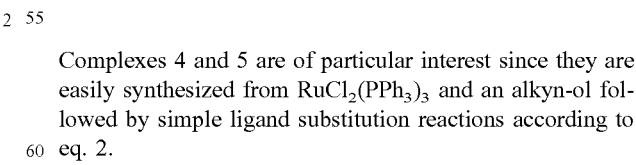

(2)

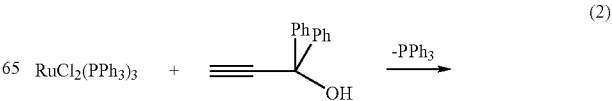

-continued

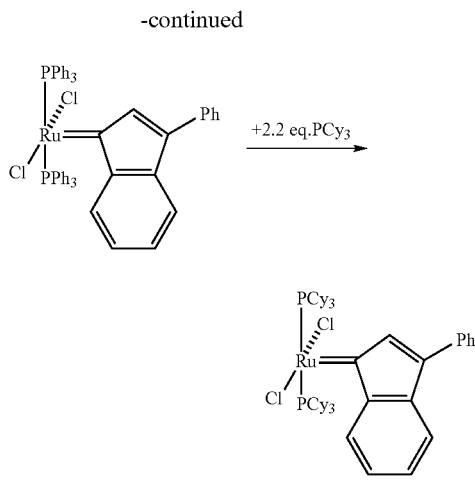

This unusual rearrangement of an alkyn-ol into an indenylidene results in ruthenium complexes that are quite active in a number of olefin metathesis transformations.

The following US patents are incorporated herein by reference:

U.S. Pat. No. 6,403,802 Use of catalyst system comprising nickel, palladium, or platinum and imidazoline-2-ylidene or imidazolidine-2-ylidene in amination reactions U.S. Pat. No. 6,403,801 Use of a catalyst system comprising nickel, palladium, or platinum and imidazoline-2-ylidene of imidazolidine-2-ylidene in Suzuki coupling reactions U.S. Pat. No. 6,369,265 Use of a catalyst system comprising nickel, palladium, or platinum and imidazoline-2-ylidene or imidazolidine-2-ylidene in Kumada coupling reactions U.S. Pat. No. 6,362,357 Use a catalyst system comprising nickel palladium or platinum and imidazoline-2-ylidene or imidazolidine-2-ylidene in stille coupling reactions U.S. Pat. No. 6,316,380 Catalyst system comprising transition metal and imidazoline-2-ylidene or imidazolidine-2-ylidene.

U.S. Pat. No. 6,586,599 Catalyzed coupling reactions of aryl halides with silanes;

U.S. Pat. No. 6,583,307 Convenient and efficient Suzuki-Miyaura cross-coupling catalyzed by a palladium/diazabutadiene system;

U.S. Pat. No. 6,403,802 Use of catalyst system comprising nickel, palladium, or platinum and imidazoline-2-ylidene or imidazolidine-2-ylidene in amination reactions;

U.S. Pat. No. 6,403,801 Use of a catalyst system comprising nickel, palladium, or platinum and imidazoline-2-ylidene of imidazolidine-2-ylidene in suzuki coupling reactions;

U.S. Pat. No. 6,369,265 Use of a catalyst system comprising nickel, palladium, or platinum and imidazoline-2-ylidene or imidazolidine-2-ylidene in kumada coupling reactions;

U.S. Pat. No. 6,362,357 Use a catalyst system comprising nickel palladium or platinum and imidazoline-2-ylidene or imidazolidine-2-ylidene in stille coupling reactions;

U.S. Pat. No. 6,316,380 Catalyst system comprising transition metal and imidazoline-2-ylidene or imidazolidine-2-ylidene;

U.S. Pat. No. 5,110,948 Organosamarium catalysts for the hydroamination of olefins;

US Patent Application 20020198423 A1 Convenient and efficient suzuki-miyaura cross-coupling catalyzed by a palladium/diazabutadiene system;

United States Patent Application 20020173650 A1 Metal complexes for hydrogenation of unsaturated compounds;

All of my prior US patent applications are incorporated herein by reference, including Ser. Nos. 09/392,869, 09/507,958, 09/907,526, 10/011,680 (application published as US2002/0173650), No. 60/407,073.

BRIEF SUMMARY OF THE INVENTION

The present invention includes a process for the preparation of ruthenium-based olefin metathesis catalysts. The inventor has discovered that Ru-carbene complexes can be made from the Ru-indenylidene complex by cross metathesis. Other prior art routes are described above in the Background of the Invention.

The present invention thus includes a process for the preparation of ruthenium-based olefin metathesis catalysts, comprising making Ru-carbene complexes from a Ru-indenylidene complex by cross metathesis. Preferably, the process includes providing a Ru-indenylidene complex and an excess of an olefin. The present invention includes a process for the preparation of ruthenium-based olefin metathesis catalysts, comprising eq. 3 or a process similar to eq. 3, with one or more of the following variations:

in place of Cl one could use other halides, pseudohalides, alkoxides, aryloxides, anionic species etc.;

$PCy_3$ can be N-heterocyclic carbene (NHC), and mixed $NHC/PR_3$ combinations;

either of the $PCy_3$ can be any 2-electron donor.

The present invention includes a synthetic method leading to the isolation of ruthenium-based olefin metathesis catalysts comprising a cross metathesis reaction between $(L_1)Ru(L_2)$(3-phenylindenylid-1-ene)$Cl_2$ (where $L_1$ and $L_2$ can be two-electron donors) and an olefin.

In any process or method of the present invention, at least one of the following ruthenium olefin metathesis catalysts is preferably isolated:

$RuCl_2(PCy_3)_2$ (C(H)R), $RuCl_2(PCy_3)$(IMes) (C(H)R) where IMes is bis(2,4,6 trimethylphenyl imidazol-2-ylidene, $RuCl_2(PCy_3)$(SIMes) (C(H)R) where SIMes is bis(2,4,6 trimethylphenyl imidazolidine, $RuCl_2$(pyridine)$_2$ (L)(C(H)R) where L=IMes, SIMes, $RuCl_2(PPh_3)$(IMes) (C(H)R) where IMes is bis(2,4,6 trimethylphenyl imidazol-2-ylidene, $RuCl_2(PPh_3)$(SIMes) (C(H)R) where SIMes is bis(2,4,6 trimethylphenyl imidazolidine, where R=Ph, vinyl, etc.

Though a specific example is shown in the Detailed Description, the scope of the present invention includes general ancillary ligands (in place of Cl one could use other halides, pseudohalides, alkoxides, aryloxides, anionic species etc.); $PCy_3$ can be N-heterocyclic carbene (NHC), and mixed NI-IC/PR3 combinations; in general either of the PCy3 can be any 2-electron donor.

DETAILED DESCRIPTION OF THE INVENTION

To further capitalize on the activity of the indenylidene complexes, the present inventor reasoned that complex 1 could be synthesized via a cross metathesis reaction according to eq. 3 eliminating the need for hazardous handling of a diazo reagent.

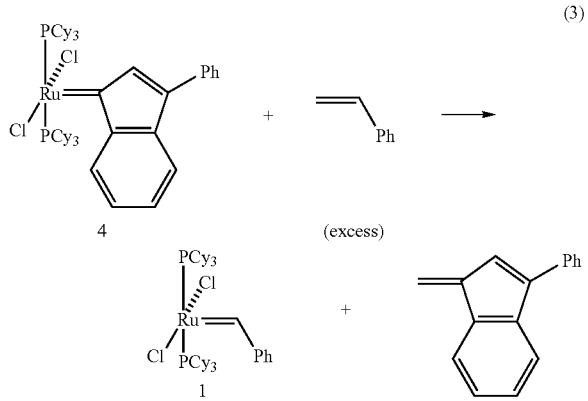

(3)

The described method appears general and various alkylidenes can be synthesized in this manner.

Though a specific example is shown above, the scope of the present invention includes general ancillary ligands (in place of Cl one could use other halides, pseudohalides, alkoxides, aryloxides, anionic species etc.); $PCy_3$ can be N-heterocyclic carbene (NHC), and mixed $NHC/PR_3$ combinations; in general either of the $PCy_3$ can be any 2-electron donor.

The present invention thus includes a process for the preparation of ruthenium-based olefin metathesis catalysts, including those mentioned above in the Background of the Invention. The inventor has discovered that Ru-carbene complexes can be made from the Ru-indenylidene complex by cross metathesis.

The present invention thus includes a process for the preparation of ruthenium-based olefin metathesis catalysts, comprising making Ru-carbene complexes from a Ru-indenylidene complex by cross metathesis. Preferably, the process includes providing a Ru-indenylidene complex and an excess of an olefin. The present invention includes a process for the preparation of ruthenium-based olefin metathesis catalysts, comprising eq. 3 or a process similar to eq. 3, with one or more of the following variations:

in place of Cl one could use other halides, pseudohalides, alkoxides, aryloxides, anionic species etc.;

$PCy_3$ can be N-heterocyclic carbene (NHC), and mixed $NHC/PR_3$ combinations;

either of the $PCy_3$ can be any 2-electron donor.

The present invention includes a synthetic method leading to the isolation of ruthenium-based olefin metathesis catalysts comprising a cross metathesis reaction between $(L_1)$ $Ru(L_2)$(3-phenylindenylid-1-ene)$Cl_2$ (where $L_1$ and $L_2$ can be two-electron donors) and an olefin.

In any process or method of the present invention, at least one of the following ruthenium olefin metathesis catalysts is preferably isolated:

$RuCl_2(PCy_3)_2$ (C(H)R), $RuCl_2(PCy_3)$(IMes) (C(H)R) where IMes is bis(2,4,6 trimethylphenyl imidazol-2-ylidene, $RuCl_2$ $(PCy_3)$(SIMes) (C(H)R) where SIMes is bis(2,4,6 trimethylphenyl imidazolidine, $RuCl_2$(pyridine)$_2$ (L)(C(H)R) where L=IMes, SIMes, $RuCl_2(PPh_3)$(IMes) (C(H)R) where IMes is bis(2,4,6 trimethylphenyl imidazol-2-ylidene, $RuCl_2(PPh_3)$ (SIMes) (C(H)R) where SIMes is bis(2,4,6 trimethylphenyl imidazolidine, where R=Ph, vinyl, etc.

References and Notes (All Incorporated Herein by Reference)

(1) (a) Grubbs, R. H.; Chang, S. *Tetrahedron* 1998, 54, 4413–and references therein. (b) Ivin, K. *J. Mol. Catal. A: Chem.*, 1998, 133, 1–16. (c) Randall, M. L.; Snapper, M. L. *J. Mol. Catal. A: Chem.*, 1998, 133, 29–40. (d) Trnka, T.; Grubbs, R. H. *Acc. Chem. Res.* 2001, 34, 18–29. (e) Jafarpour, L.; Nolan, S. P. *J. Organomet. Chem.* 2001, 617, 17–27.

(2) (a) Schwab, P.; France, M. B.; Ziller, J. W.; Grubbs, R. H. *Angew. Chem. Int. Ed. Engl.* 1995, 34, 2039–2041. (b) Schwab, P.; Grubbs, R. H.; Ziller. J. W. *J. Am. Chem. Soc.* 1996, 118, 100–110. (c) Diaz, E. L.; Nguyen, S. T.; Grubbs, R. H. *J. Am. Chem. Soc.* 1997, 119, 3887–3897 and references cited.

(3) (a) Huang, J.; Stevens, E. D.; Nolan, S. P.; Petersen, J. L. *J. Am. Chem. Soc.* 1999, 121, 2674–2678. (b) Huang, J.; Schanz, H. -J.; Stevens, E. D.; Nolan, S. P. *Organometallics* 1999, 18, 5375–5380. (c) Scholl, M.; Trnka, T. M.; Morgan, J. P.; Grubbs, R. H. *Tetrahedron Lett.* 1999, 40, 2247–2250. (d) Ackermann, L.; Fürstner, A.; Weskamp, T.; Kohl, F. J.; Herrmann, W. A. *Tetrahedron Lett.* 1999, 40, 4748–4790. (e) Scholl, M.; Ding, S.; Lee, C. W.; Grubbs, R. H. *Org. Lett.* 1999, 1, 1751–1753. (f) Fürstner, A.; Thiel, O. R.; Ackermann, L.; Schanz, H. -J.; Nolan, S. P. *J. Org. Chem.* 2000, 65, 2204–2207. (g) Briot, A.; Bujard, M.; Gouverneur, V.; Nolan, S. P.; Mioskowski, C. *Org. Lett.* 2000, 2, 1517–1519.

(4) (a) Scholl, M.; Ding, S.; Lee, C. W.; Grubbs, R. H. *Organic Lett.* 1999, 1, 953–956. (b) Chatterjee, A. K.; Morgan, J. P.; Scholl, M.; Grubbs, R. H. *J. Am. Chem. Soc.* 2000, 122, 3783–3784. (c) Chatterjee, A. K.; Grubbs, R. H. *Organic Lett.* 1999, 1, 1751–1753.

(5) (a) Fürstner, A.; Hill, A. F.; Liebl, M.; Wilton-Ely, J. D. E. T. *Chem. Commun.* 1999, 601–602. (b) Jafarpour, L.; Schanz, H. -J.; Stevens, E. D.; Nolan, S. P. *Organometallics* 1999, 18, 5416–5419.

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A process for the preparation of ruthenium-based olefin metathesis catalysts, comprising:
   providing a Ru-indenylidene complex; and
   using cross metathesis to make Ru-carbene complexes from the Ru-indenylidene complex.

2. The process of claim 1, comprising:
   providing a Ru-indenylidene complex and an excess of an olefin.

3. A process for the preparation of ruthenium-based olefin metathesis catalysts, comprising:

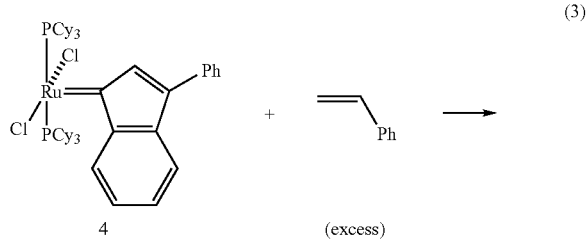

(3)

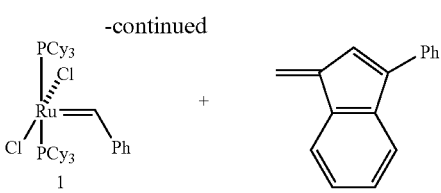

4. A process for the preparation of ruthenium-based olefin metathesis catalysts, comprising

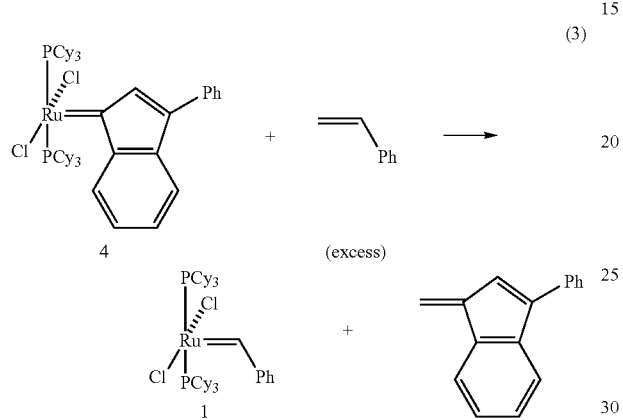

with one or more of the following variations:
    in place of Cl use other halides, pseudohalides, alkoxides or aryloxides,
    $PCy_3$ is N-heterocyclic carbene (NHC), or mixed NHC/$PR_3$ combinations;
    either of the $PCy_3$ is a 2-electron donor.

5. A synthetic method leading to the isolation of ruthenium-based olefin metathesis catalysts comprising:
    providing $(L_1)Ru(L_2)$(3-phenylindenylid-1-ene)$Cl_2$ (where $L_1$ and $L_2$ are two-electron donors); and
    providing an olefin; and
    causing a cross metathesis reaction between $(L_1)Ru(L_2)$(3-phenylindenylid-1-ene)$Cl_2$ (where $L_1$ and $L_2$ are two-electron donors) and an olefin.

6. The method of claim 5, wherein at least one of the following ruthenium olefin metathesis catalysts is isolated:
    $RuCl_2(PCy_3)_2(C(H)R)$, $RuCl_2(PCy_3)(IMes)(C(H)R)$ where IMes is bis( 2,4,6 trimethylphenyl imidazol-2-ylidene, $RuCl_2(PCy_3)(SIMes)(C(H)R)$ where SIMes is bis( 2,4,6 trimethylphenyl imidazolidine, $RuCl_2(pyridine)_2(L)(C(H)R)$ where L=IMes, SIMes, $RuCl_2(PPh_3)$(IMes)(C(H)R) where IMes is bis(2,4,6 trimethylphenyl imidazol-2-ylidene, $RuCl_2(PPh_3)(SIMes)(C(H)R)$ where SIMes is bis(2,4,6 trimethylphenyl imidazolidine, where R=Ph or vinyl.

7. The process of claim 4, wherein at least one of the following ruthenium olefin metathesis catalysts is isolated:
    $RuCl_2(PCy_3)_2(C(H)R)$, $RuCl_2(PCy_3)(IMes)(C(H)R)$ where IMes is bis(2,4,6 trimethylphenyl imidazol-2-ylidene, $RuCl_2(PCy_3)(SIMes)(C(H)R)$ where SIMes is bis(2,4,6 trimethylphenyl imidazolidine, $RuCl_2(pyridine)_2(L)(C(H)R)$ where L=IMes, SIMes, $RuCl_2(PPh_3)$(IMes)(C(H)R) where IMes is bis (2,4,6 trimethylphenyl imidazol-2-ylidene, $RuCl_2(PPh_3)(SIMes)(C(H)R)$ where SIMes is bis (2,4,6 trimethylphenyl imidazolidine, where R=Ph or vinyl.

8. The process of claim 3, wherein at least one of the following ruthenium olefin metathesis catalysts is isolated:
    $RuCl_2(PCy_3)_2(C(H)R)$, $RuCl_2(PCy_3)(IMes)(C(H)R)$ where IMes is bis(2,4,6 trimethylphenyl imidazol-2-ylidene, $RuCl_2(PCy_3)(SIMes)(C(H)R)$ where SIMes is bis(2,4,6 trimethylphenyl imidazolidine, $RuCl_2(pyridine)_2(L)(C(H)R)$ where L=IMes, SIMes, $RuCl_2(PPh_3)$(IMes)(C(H)R) where IMes is bis(2,4,6 trimethylphenyl imidazol-2-ylidene, $RuCl_2(PPh_3)(SIMes)(C(H)R)$ where SIMes is bis(2,4,6 trimethylphenyl imidazolidine, where R=Ph or vinyl.

9. The process of claim 2, wherein at least one of the following ruthenium olefin metathesis catalysts is isolated:
    $RuCl_2(PCy_3)_2(C(H)R)$, $RuCl_2(PCy_3)(IMes)(C(H)R)$ where IMes is bis(2,4,6 trimethylphenyl imidazol-2-ylidene, $RuCl_2(PCy_3)(SIMes)(C(H)R)$ where SIMes is bis (2,4,6 trimethylphenyl imidazolidine, $RuCl_2(pyridine)_2(L)(C(H)R)$ where L=IMes, SIMes, $RuCl_2(PPh_3)$(IMes)(C(H)R) where IMes is bis(2,4,6 trimethylphenyl imidazol-2-ylidene, $RuCl_2(PPh_3)(SIMes)(C(H)R)$ where SIMes is bis(2,4,6 trimethylphenyl imidazolidine, where R=Ph or vinyl.

10. The process of claim 1, wherein at least one of the following ruthenium olefin metathesis catalysts is isolated:
    $RuCl_2(PCy_3)_2(C(H)R)$, $RuCl_2(PCy_3)(IMes)(C(H)R)$ where IMes is bis(2,4,6 trimethylphenyl imidazol-2-ylidene, $RuCl_2(PCy_3)(SIMes) (C(H)R)$ where SIMes is bis (2,4,6 trimethylphenyl imidazolidine, $RuCl_2(pyridine)_2(L)(C(H)R)$ where L=IMes, SIMes, $RuCl_2(PPh_3)$(IMes)(C(H)R) where IMes is bis(2,4,6 trimethylphenyl imidazol-2-ylidene, $RuCl_2(PPh_3)(SIMes) (C(H)R)$ where SIMes is bis(2,4,6 trimethylphenyl imidazolidine, where R=Ph or vinyl.

* * * * *